United States Patent
Hughes et al.

(10) Patent No.: US 10,664,273 B2
(45) Date of Patent: May 26, 2020

(54) DELAYED PREFETCH MANAGER TO MULTICAST AN UPDATED CACHE LINE TO PROCESSOR CORES REQUESTING THE UPDATED DATA

(71) Applicant: Intel Corporation, Santa Clara, CA (US)

(72) Inventors: Christopher J. Hughes, Santa Clara, CA (US); Dan Baum, Haifa (IL)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 15/941,958

(22) Filed: Mar. 30, 2018

(65) Prior Publication Data

US 2019/0303152 A1 Oct. 3, 2019

(51) Int. Cl.
  *G06F 9/30* (2018.01)
  *G06F 15/80* (2006.01)
  *G06F 12/0862* (2016.01)

(52) U.S. Cl.
  CPC ...... *G06F 9/30047* (2013.01); *G06F 9/30036* (2013.01); *G06F 12/0862* (2013.01); *G06F 15/8069* (2013.01)

(58) Field of Classification Search
  CPC ... G06F 9/30047; G06F 9/383; G06F 12/0862
  See application file for complete search history.

(56) References Cited

U.S. PATENT DOCUMENTS

| | | | |
|---|---|---|---|
| 2006/0085602 A1 | 4/2006 | Huggahalli et al. | |
| 2014/0149718 A1* | 5/2014 | Hughes | G06F 9/30036 712/208 |
| 2014/0164705 A1* | 6/2014 | Corbal | G06F 9/30047 711/122 |
| 2014/0258681 A1* | 9/2014 | Prasky | G06F 9/30145 712/207 |
| 2016/0110289 A1* | 4/2016 | Hooker | G06F 12/0831 |
| 2017/0132133 A1* | 5/2017 | Gschwind | G06F 12/0862 |
| 2017/0286295 A1* | 10/2017 | Wilerkson | G06F 12/0808 |
| 2017/0344483 A1 | 11/2017 | Shwartsman et al. | |

OTHER PUBLICATIONS

European Search Report and Search Opinion, EP App. No. 19161446, dated Dec. 4, 2019, 7 pages.

* cited by examiner

*Primary Examiner* — Jacob Petranek
(74) *Attorney, Agent, or Firm* — Nicholson De Vos Webster & Elliott LLP

(57) ABSTRACT

An apparatus and method for processing efficient multicast operation. For example, one embodiment of a processor comprises: a plurality of cores to execute instructions; a shared circuitry region to be shared by the plurality of cores; first cache management circuitry associated with the shared circuitry region to receive delayed prefetch messages from the cores, each delayed prefetch message comprising an address or portion thereof usable to identify a cache line; and a delayed prefetch manager comprising a plurality of entries, each entry associated with at least one of the delayed prefetch messages, the delayed prefetch manager to update one or more of the entries or generate a new entry in accordance with receipt of each new delayed prefetch message, wherein upon receiving a notification that a first cache line is being modified by a first core, the delayed prefetch manager is to transmit delayed prefetch response messages to one or more cores identified in a first entry associated with the first cache line.

28 Claims, 17 Drawing Sheets

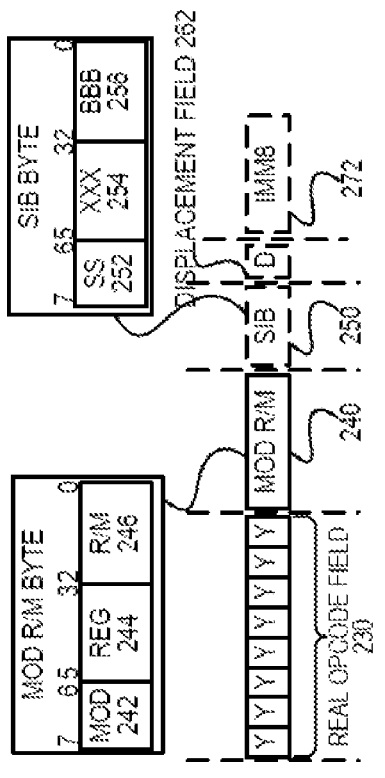
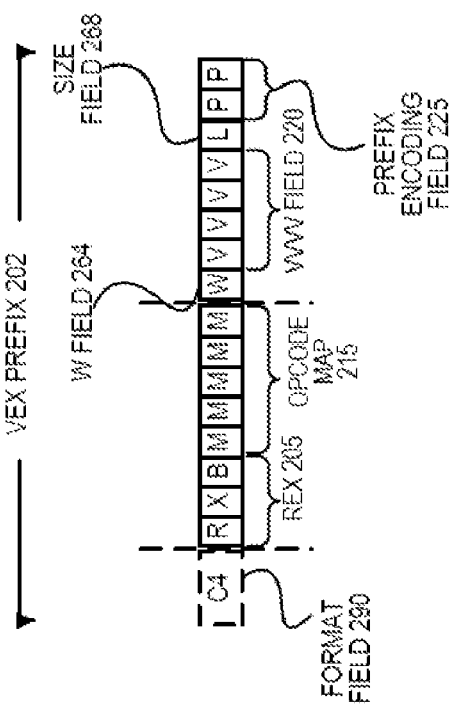
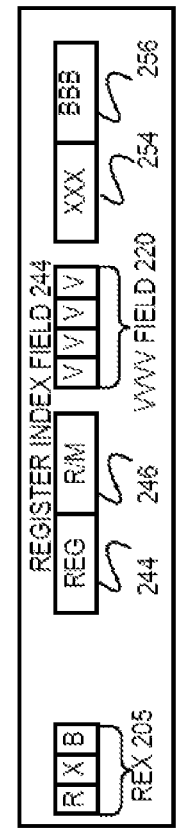
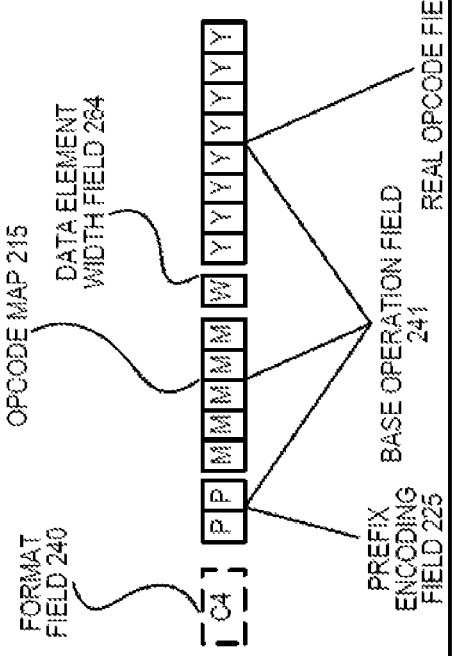
FIG. 2A
FIG. 2B
FIG. 2C

FIG. 3
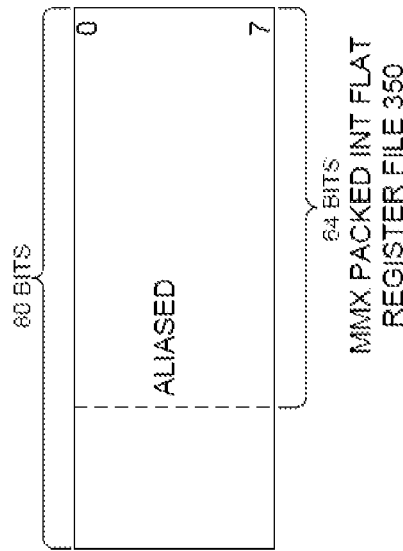
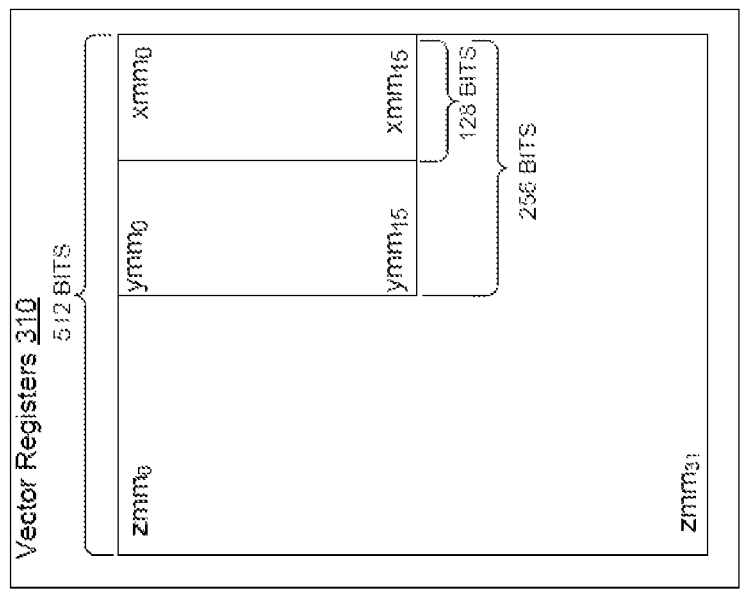

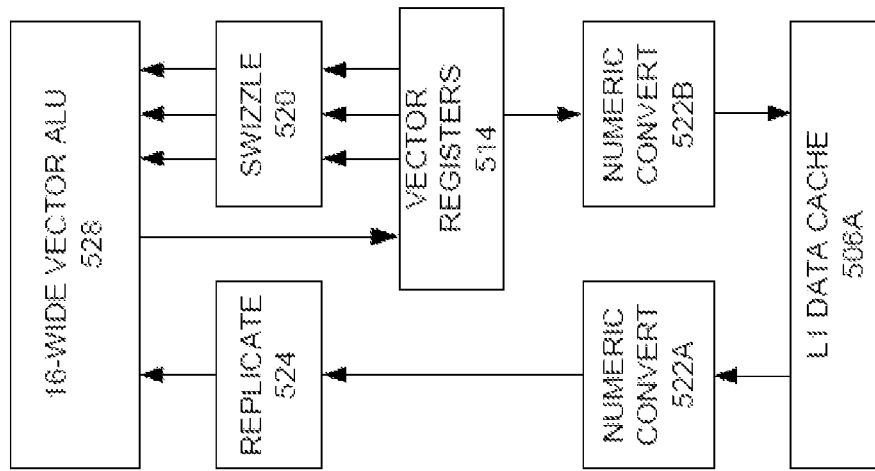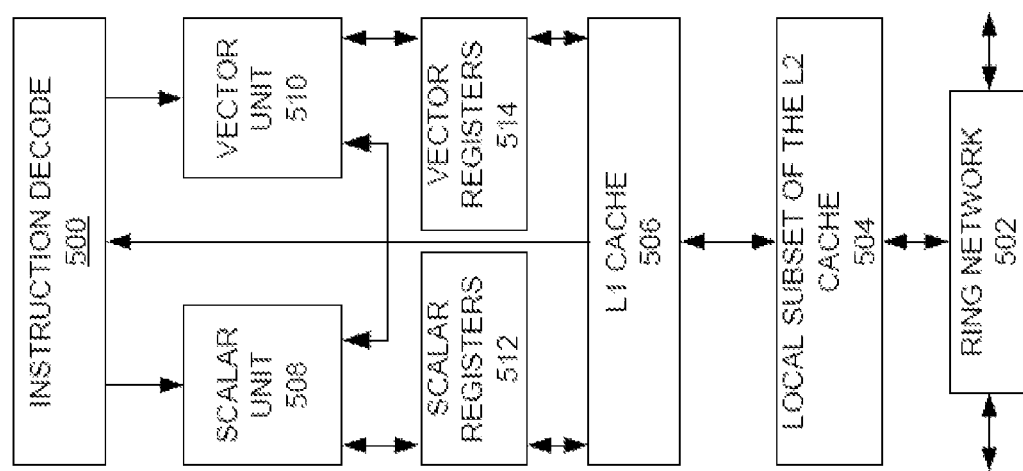

DELAYED PREFETCH MANAGER TO MULTICAST AN UPDATED CACHE LINE TO PROCESSOR CORES REQUESTING THE UPDATED DATA

BACKGROUND

Field of the Invention

The embodiments of the invention relate generally to the field of computer processors. More particularly, the embodiments relate to a delayed prefetch manager to multicast an updated cache line to processor cores requesting the updated data.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

BRIEF DESCRIPTION OF THE DRAWINGS

A better understanding of the present invention can be obtained from the following detailed description in conjunction with the following drawings, in which:

FIGS. 2A-C are block diagrams illustrating an exemplary VEX instruction format according to embodiments of the invention;

FIG. 3 is a block diagram of a register architecture according to one embodiment of the invention.

FIG. 5A is a block diagram of a single processor core, along with its connection to an on-die interconnect network;

FIG. 5B illustrates an expanded view of part of the processor core in FIG. 5A according to embodiments of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1A:
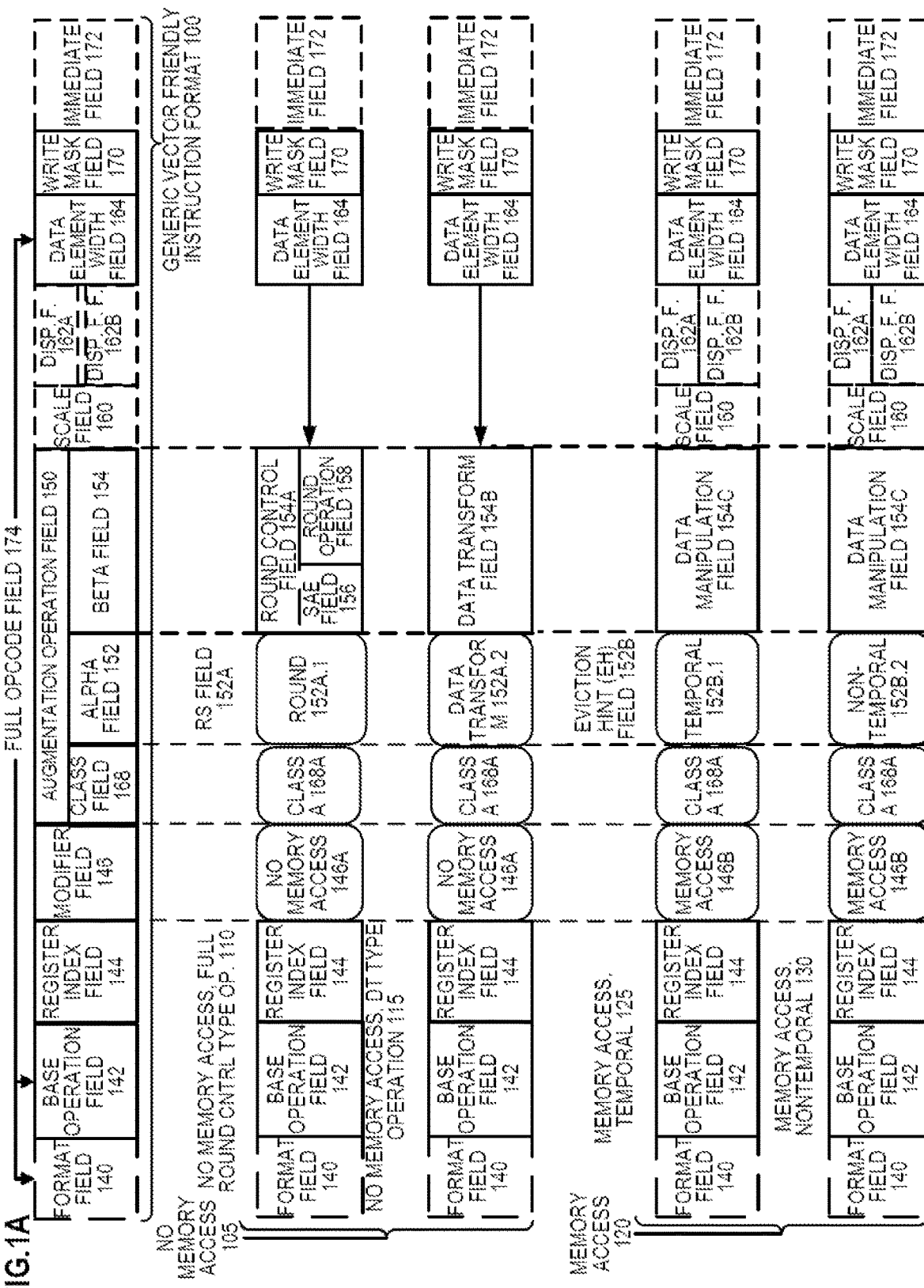
FIGS. 1A and 1B are block diagrams illustrating a generic vector friendly instruction format and instruction templates thereof according to embodiments of the invention.
Figure 1B:
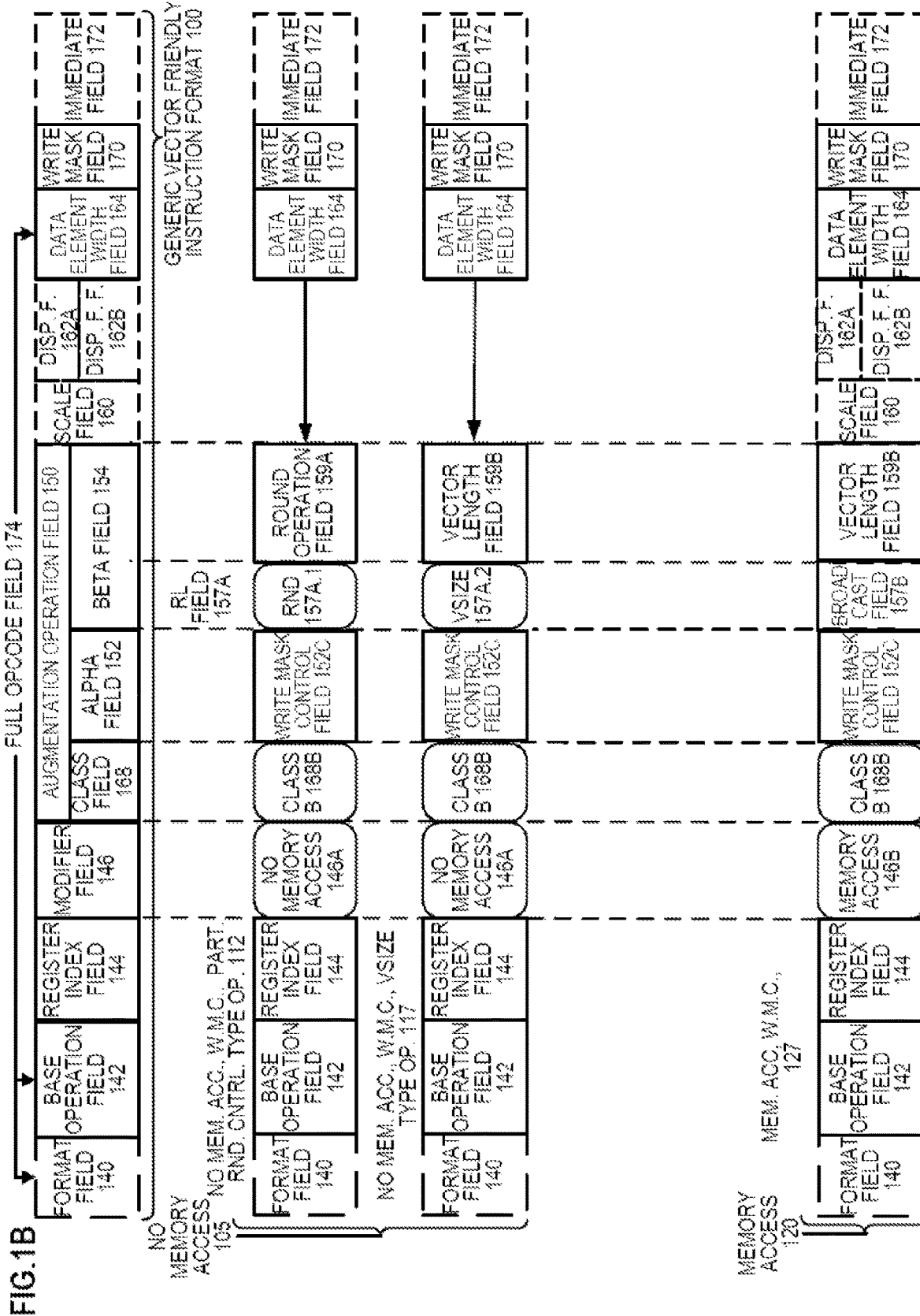

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*index+base$).

Displacement Field 162A—its content is used as part of memory address generation (e.g., for address generation that uses $2^{scale}*\text{index}+\text{base}+\text{displacement}$).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]—mmmmm) includes content to encode an implied leading opcode byte. W Field 264 (VEX byte 2, bit [7]—W)—is represented by the notation VEX.W, and provides different functions depending on the instruction. The role of VEX.vvvv 220 (VEX Byte 2, bits [6:3]—vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

Figure 4A:
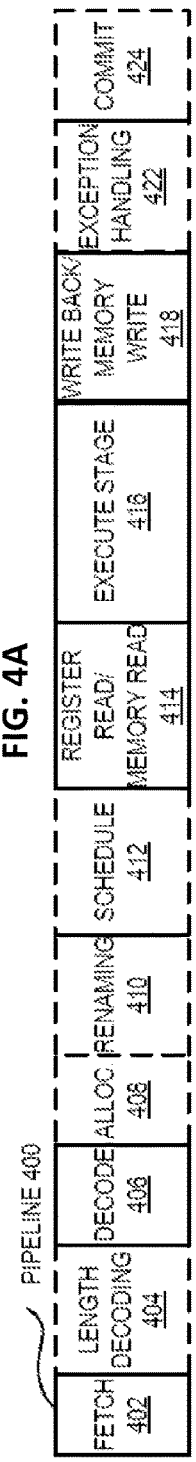
FIG. 4A is a block diagram illustrating both an exemplary in-order fetch, decode, retire pipeline and an exemplary register renaming, out-of-order issue/execution pipeline according to embodiments of the invention.
Figure 4B:
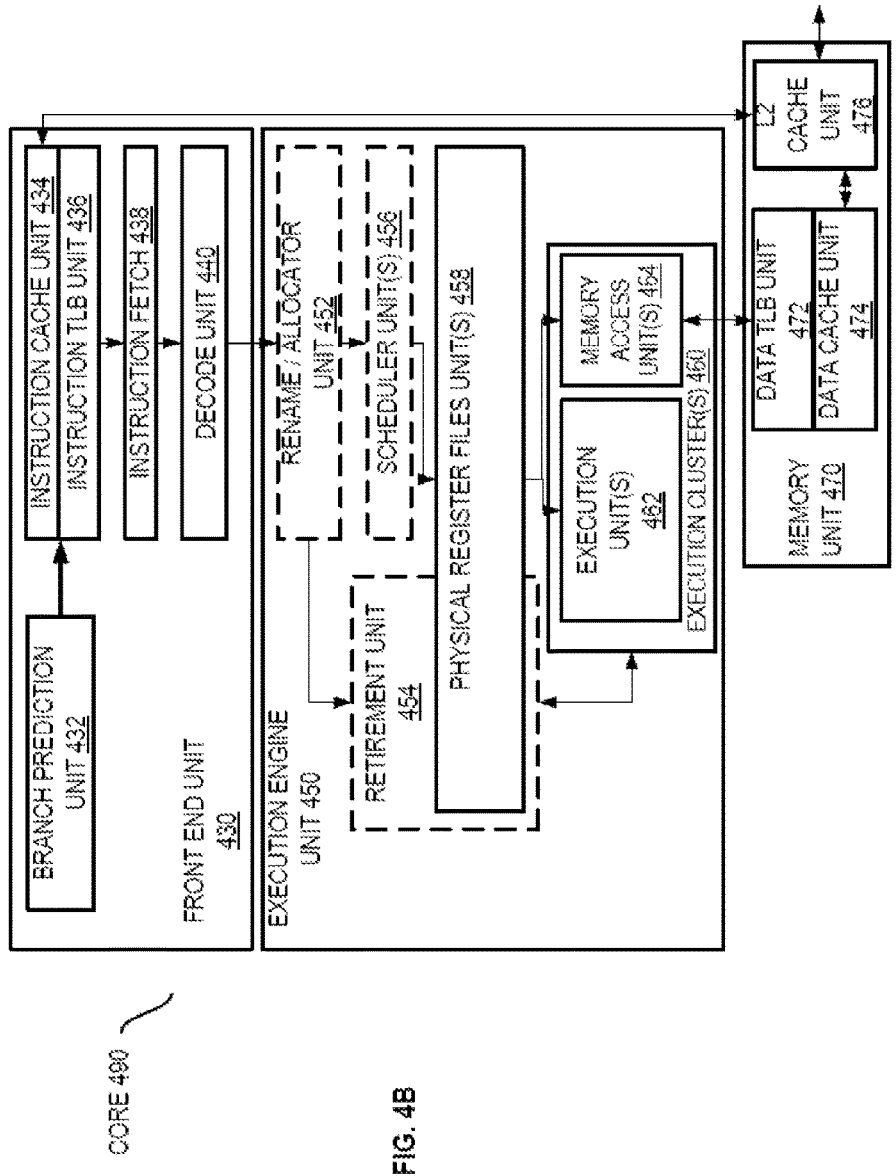
FIG. 4B is a block diagram illustrating both an exemplary embodiment of an in-order fetch, decode, retire core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
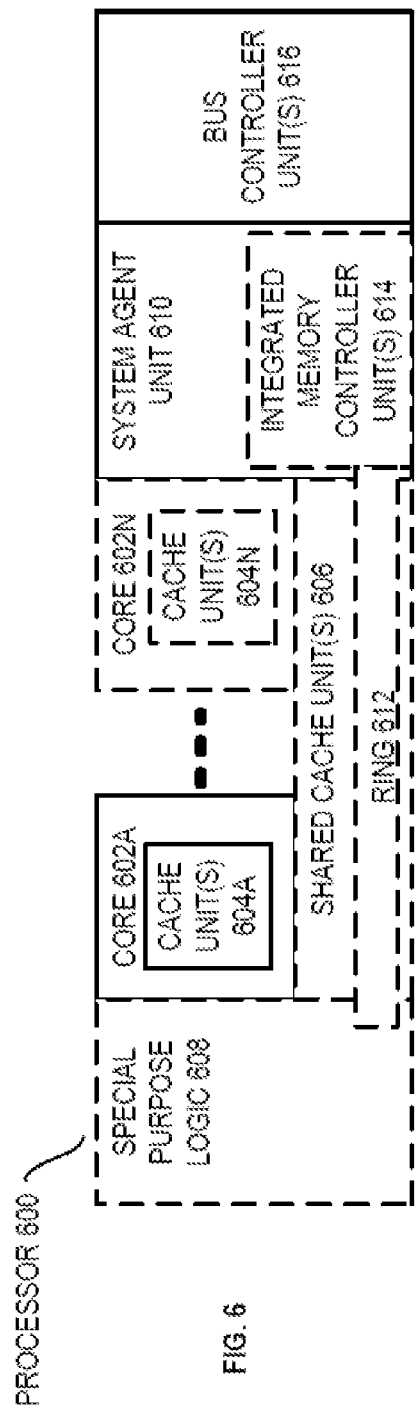
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
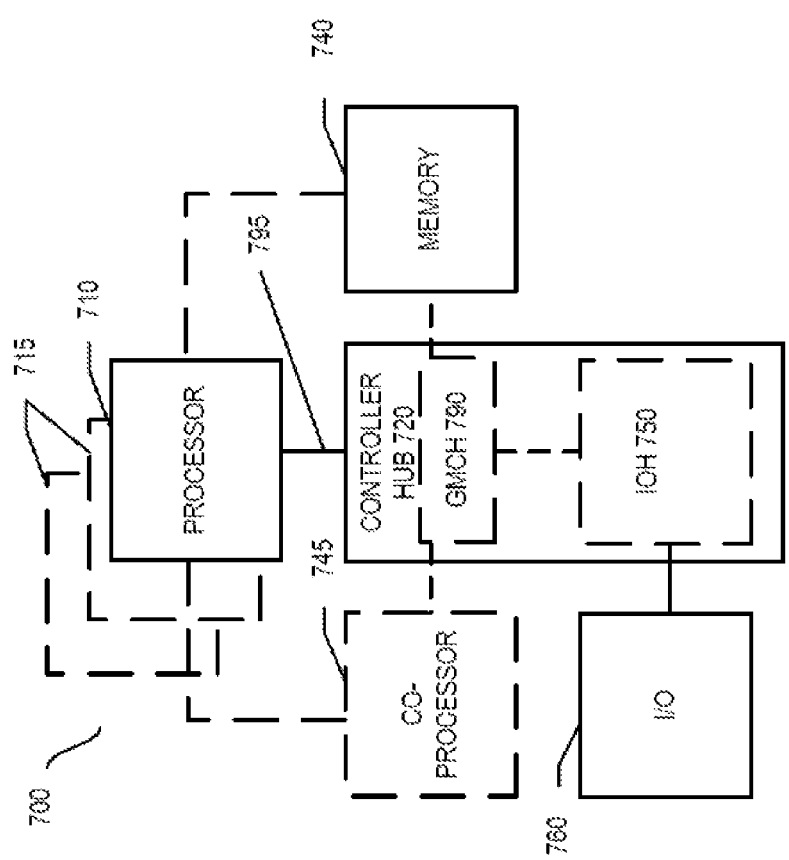
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
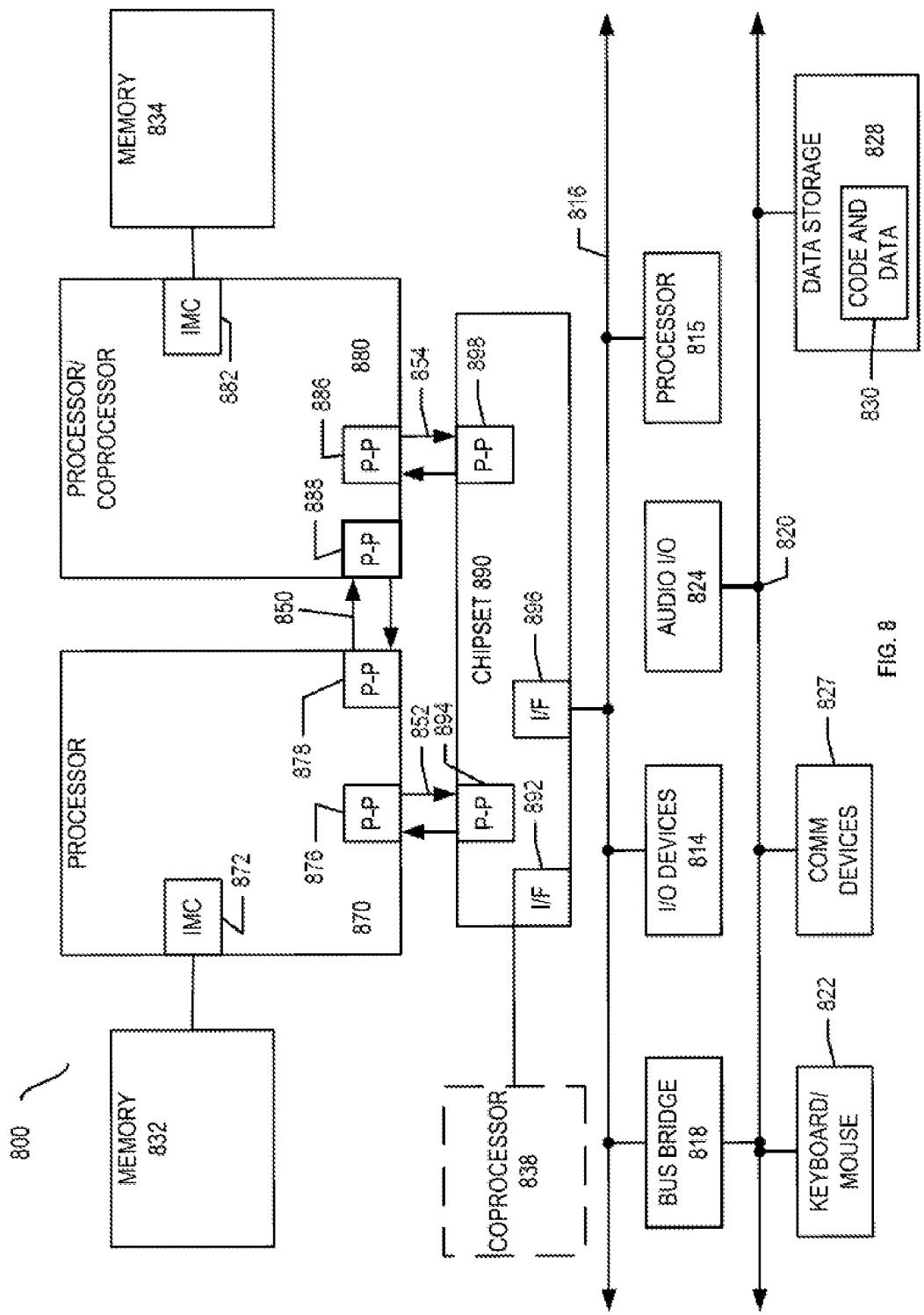
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
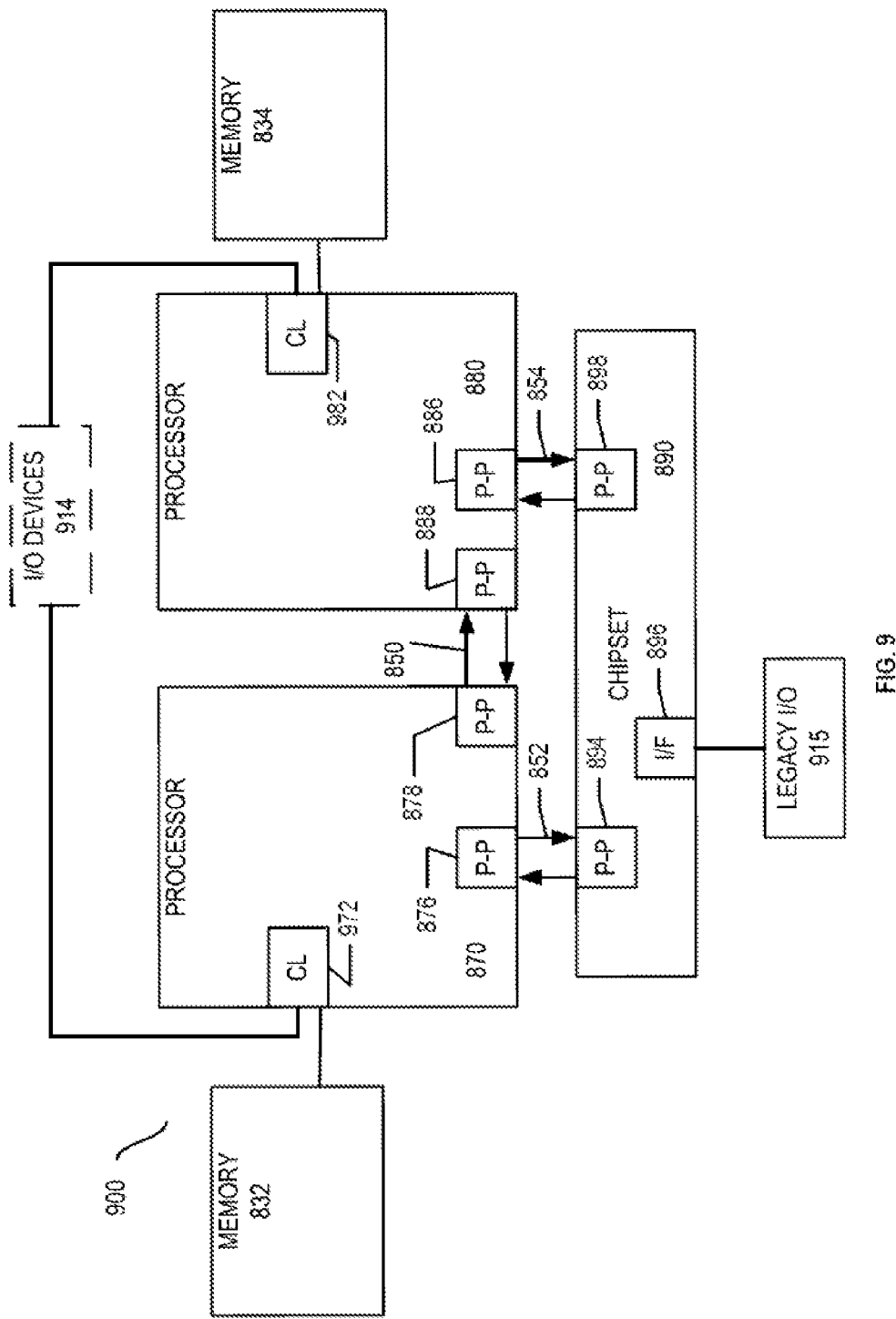
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
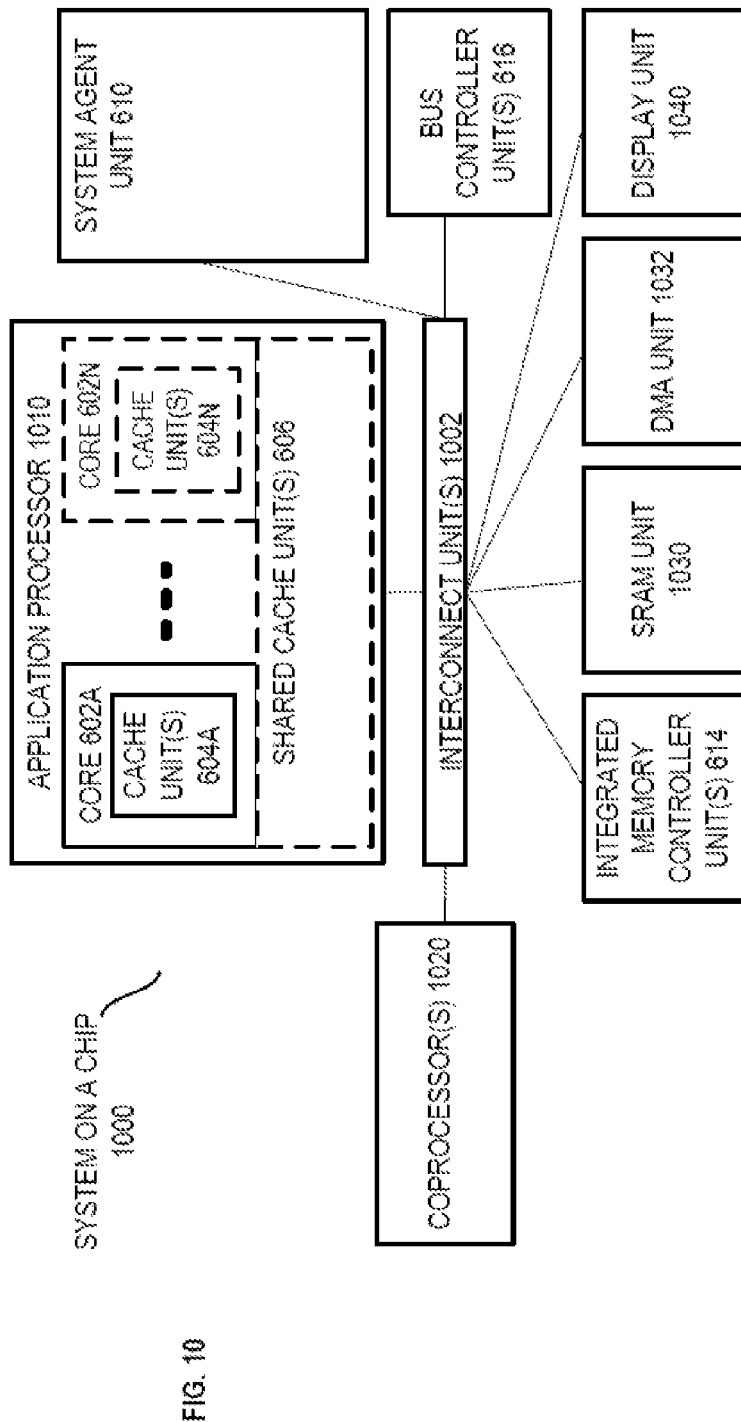
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
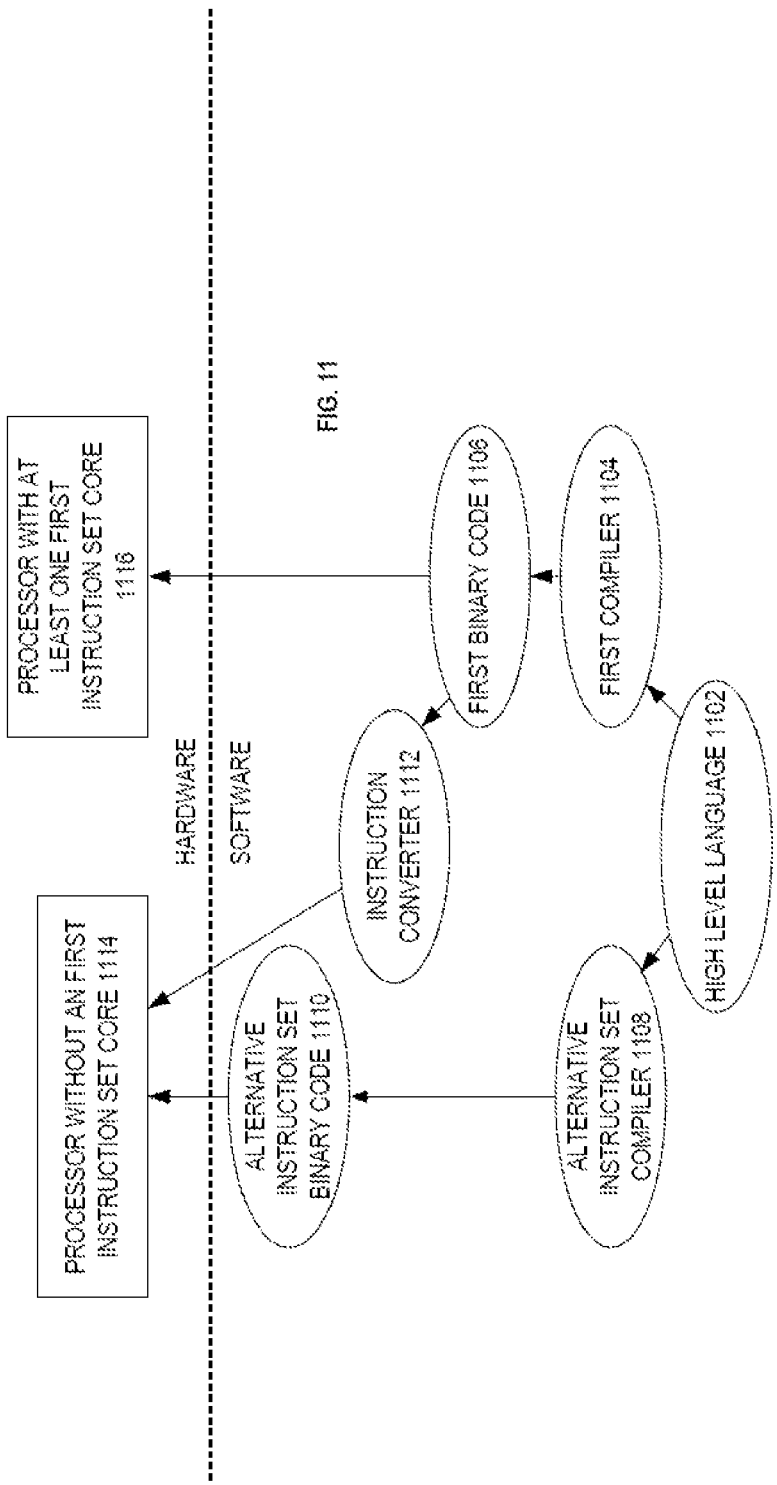
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Apparatus and Method for Processing Efficient Multicast Operation

A common primitive in cooperative multithreaded codes is for a single thread to communicate a piece of data or a signal to many/all threads. On some microarchitectures, this is accomplished using a multicast or broadcast instruction which is executed immediately after a barrier memory. For example, the last thread to arrive at a barrier will signal all others that they may leave the barrier. In some cases, this signal may be accompanied by a result that was computed just before the barrier (e.g., the result of a reduction).

Currently, the fastest communication mechanism between cores is via writes and reads to shared memory locations. However, when a single thread propagates a signal or piece of data to many other threads, the sequence of events in the cores and uncore is inefficient.

For example, if a set of worker threads are waiting for a wake-up signal from a master thread, all the worker threads will repeatedly read a single cache line containing the wake-up signal, creating pressure on a specific cache agent or controller. Shared caches are frequently physically partitioned into multiple pieces, so that a set of cores accessing a set of lines can have their requests processed in parallel by multiple cache agents. However, if all cores access the same line, then a single agent must handle a potentially large number of requests, for which it may not be optimized. When ready to send the signal, the master thread sends a request for ownership (RFO) request to the cache agent which will be delayed by any pending read requests. Upon receiving the master thread's RFO request, the cache agent will send snoops to all workers with a copy of the line, and the cores will respond, again sending a lot of requests to and from a single cache agent which will reply to the master thread, giving it the line in a writeable state. The master thread will then write to the line.

The embodiments of the invention described herein implement a "cache agent" architecture. A "cache agent" or CA comprises cache management circuitry for managing a plurality of caches and ensuring the coherence for cache lines shared between the caches (e.g., by implementing a cache coherency protocol).

None of the worker threads have a copy of the line anymore, so their next reads will result in them sending requests to the cache agent—creating further pressure. The first read request to reach the cache agent will trigger the cache agent sending a snoop to the master thread to grab the updated data. After the master thread responds with the data, the cache agent will send the data to all worker threads, one response at a time.

The number of actions at the cache agent (CA) for this example are tabulated in Table A below, along with the latency for each action.

TABLE A

| Event | # Actions at CA for the line (serialized) | Minimum Latency |
|---|---|---|
| Worker threads read the line | (#cores) | (Core to CA) |
| Master thread sends RFO request to the CA | 1 | Core to CA |

TABLE A-continued

| Event | # Actions at CA for the line (serialized) | Minimum Latency |
|---|---|---|
| CA sends snoops to all worker threads with the line | 1 | Core to CA × 2 |
| CA sends line + write permission to master thread | 1 | Core to CA |
| Worker threads send read requests to the CA | #cores (or more, if requests rejected) | Core to CA |
| CA sends snoop to the master thread | 1 | Core to CA |
| Master thread responds with the data | 1 | Core to CA |
| CA sends the data to all worker threads | #cores | Core to CA |
| Total | 5 + #cores × 2 | Core to CA × 8 |

One problem with some existing approaches to optimize this communication pattern is that they effectively attempt to "push" data to a private cache, which is not supported on many existing architectures.

In one embodiment of the invention, consumers implement a "pull" operation by registering with a cache agent or their L2 cache, indicating that they expect the given cache line to change, and would like to receive that updated line as promptly as possible. In particular, low latency multicasts are implemented without requiring major changes to existing cache coherence protocols (e.g., the MESI protocol) or the on-die interface (e.g., IDI). These embodiments can still take advantage of multicasts supported natively, but do not require them or the ability to push data into a private cache. The techniques described below may be particularly useful for parallel codes with frequent barriers, although the underlying principles of the invention are not limited to this particular context.

Figure 12:
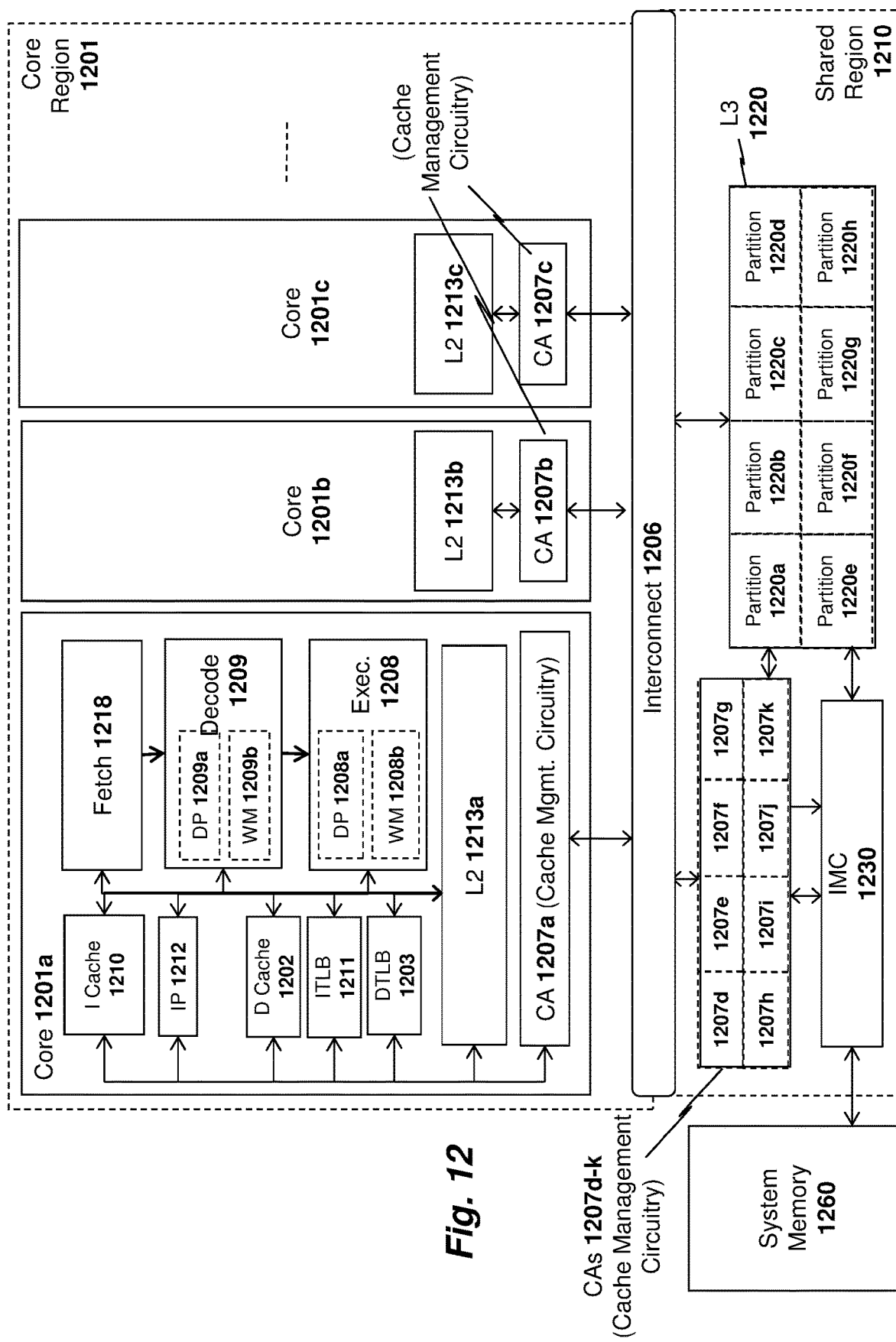
FIG. 12 illustrates a processor architecture on which embodiments of the invention may be implemented.

FIG. 12 illustrates a processor architecture on which embodiments of the invention may be implemented including a core region 1201 and a shared, or "uncore" region 1210. The shared region 1210 includes data structures and circuitry shared by all or a subset of the cores 1201*a-c*. In the illustrated embodiment, the plurality of cores 1201*a-c* may be simultaneous multithreaded cores capable of concurrently executing multiple instruction streams. Although only three cores 1201*a-c* are illustrated in FIG. 12, it will be appreciated that the core region 1201 may include any number of cores. Additional details of one core 1201*a* are shown for simplicity. In one embodiment, each of the cores 1201*b-c* include the same architecture.

In the illustrated embodiment, an interconnect 1206 such as an on-die interconnect (IDI) implementing an IDI/coherence protocol communicatively couples the cores 1201*a-c* to one another and to various components within the shared region 1210. For example, the interconnect 1206 couples caching agents 1207*a-c* of the cores to one or more caching agents 1207*d-k* in the shared region and implements a cache coherency protocol to ensure that cache lines shared between the cores remain coherent. Also illustrated within the shared region 1210 is an L3 cache 1220 coupled to cache agents-h 1207*d* and an integrated memory controller 1230 providing access to a system memory 1260. The L3 cache 1220 may be physically composed of multiple cache partitions 1220*a-h*, each with its own cache agent 1207*d-k*, respectively. One or more input/output (I/O) circuits (not shown) such as PCI express circuitry may also be included in the shared region 1210. Note that FIG. 12 is not intended to provide a comprehensive view of all components and interconnects employed within a processor. Rather, only those components which are pertinent to the embodiments of the invention are shown.

Each of the cores 1201*a-c* include instruction pipeline components for performing simultaneous, out-of-order (or in-order) execution of instruction streams including instruction fetch circuitry 1218 which fetches instructions from memory or cache and decode circuitry 1209 to decode the instructions. Execution circuitry 1208 executes the decoded instructions to perform the underlying operations, as specified by the instruction operands, opcodes, and any immediate values.

An instruction pointer register 1212 stores an instruction pointer address identifying the next instruction to be fetched, decoded, and executed. Instructions may be fetched or prefetched from system memory 1260 and/or one or more shared cache levels such as an L2 cache 1213*a-c*, the shared L3 cache 1220, or the L1 instruction cache 1210. In addition, an L1 data cache 1202 stores data loaded from system memory 1260 and/or retrieved from one of the other cache levels 1213, 1220 (which cache both instructions and data). As mentioned, cache agents (CAs) 1207*a-c* on each processor and/or cache agent 1207*d* within the shared region 1210 perform the cache management operations described herein to ensure that the state of the various cache lines remains coherent (e.g., via implementation of a cache coherency protocol).

An instruction TLB (ITLB) 1211 stores virtual address to physical address translations for the instructions fetched by the fetch circuitry 1218 and a data TLB (DTLB) 1203 stores virtual address to physical address translations for the data processed by the decode circuitry 1209 and execution circuitry 1208.

One embodiment of the invention includes two new instructions, referred to herein as Delayed Prefetch (DP) and Write Modify (WM), and the associated circuitry to implement the instructions within the cores and uncore. For example, the illustrated decoder 1209 includes DP circuitry 1209*a* and WM circuitry 1209*b* to decode these instructions and the execution circuitry includes DP circuitry 1208*a* and WM circuitry 1208*b* to execute the instructions.

In one embodiment the delayed prefetch instruction also acts as a load or read instruction, and returns data to the thread (e.g., in a register).

In one embodiment, the DP instruction indicates that the thread executing it expects the address provided in an operand to be updated in the near future, and that it would like a copy of that update. Thus, even if the line is in the core's L1 1202, it may still send a special prefetch request down to the cache agent 1207*a-c* of the L2 cache 1213*a-c* or the cache agents 1207*d-k* of the L3 cache 1220 (and potentially beyond, depending on the implementation). In one embodiment, delayed prefetches may be dropped (i.e., a reply sent with no data), since otherwise the system risks deadlock.

If a core executes a delayed prefetch, later read instructions can either hit in the L1 data cache 1202, returning perfectly valid data, or miss. In one embodiment, on an L1 miss, reads will stall until the delayed prefetch receives a response; if it contains data, the read will return that data, or else the read will result in a request sent down the cache hierarchy. The interaction between delayed prefetches and reads ensures that delayed prefetches really are prefetches, in the sense that if dropped, the program will still be correct. When a prefetch is ultimately executed, the prefetched data is stored in the L1 data cache 1203.

As mentioned, a Write Modify (WM) instruction is also employed in one embodiment, which is a write instruction which carries a hint to the hardware that one or more threads may be waiting for the data being written. The hint may be encoded any number of ways such as a bit within an operand or an immediate. In one implementation, the core does not issue an RFO for this write, since that would invalidate all readers. Instead, it will be fully executed at retirement time. The write modify instruction may be weakly ordered (although this is not required for implementing the embodiments of the invention). The weakly ordered behavior allows the core executing one of these writes to continue retiring other instructions (particularly, stores) while the write modify executes.

Figure 13:
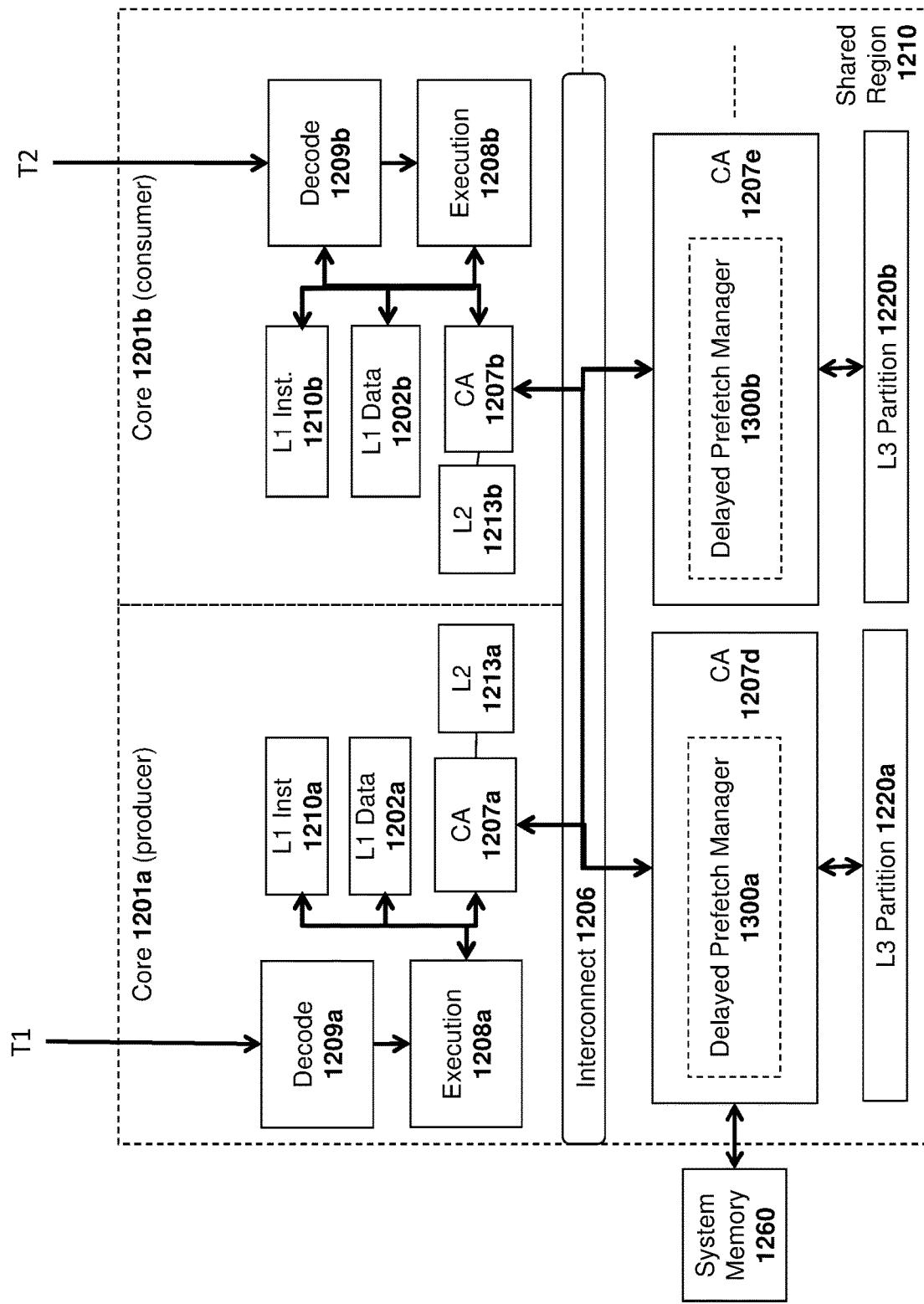
FIG. 13 illustrates one embodiment of an early page predictor (EPP)

The following are two example implementations which will be described with respect to FIG. 13 which shows a first core 1201*a* and a second core 1201*b* executing a first thread, T1, and a second thread, T2, respectively. Decode circuitry 1209*a* and execution circuitry 1208*a* decode and execute the first thread T1, respectively, and decode circuitry 1209*b* and execution circuitry 1208*b* decode and execute the second thread T2, respectively. Also shown are cache agents 1207*a-b* associated with cores 1201*a-b* and L2 caches 1213*a-b* which are coupled to the cache agents 1207*d-k* in the uncore region 1210 via interconnect 1206. While not illustrated, the L1 instruction and data caches may also have associated cache agents or cache controllers to communicate with the other core and uncore cache agents.

In this embodiment, each delayed prefetch request is transmitted to an appropriate cache agent. Thus, for example, when execution circuitry 1208*b* executes a DP instruction within thread T2, the DP request may be passed to one of the shared cache agents 1207*d-k* associated with the L3 cache 1220 and its individual partitions 1220*a-h*. Rather than bringing the current L3 cache line back to the L2 cache 1213*b*, the delayed prefetch operation causes core 1201*b* to be registered as a "consumer" of the cache line, which will be updated rather than invalidated when the cache line is next written.

In one embodiment, the shared cache agents 1207*d-k* include delayed prefetch managers 1300*a-h* (although only 1300*a-b* are shown for simplicity) to maintain consumer core registrations in response to execution of delayed prefetch instructions. In another embodiment, a single delayed prefetch manager may be implemented for all of the shared cache agents 1207*d-k*. The delayed prefetch manager may be implemented, for example, as a table, buffer or other data structure capable of tracking outstanding delayed prefetch requests from the plurality of cores. In one embodiment, after registration, the consumer core 1201*b* may enter a spin-wait loop, during which it will continue to hit the L1 cache 1202*b*, while waiting for an update.

In one implementation, if any core 1201*a-b* writes to the cache line using a conventional store, a request for ownership (RFO) is sent out, and the various cache agents will invalidate all current copies of the line. This may (but does not have to) result in all delayed prefetches for the line being dropped.

If instead, core 1201*a* executing thread T1 writes to the cache line with a write modify instruction, then that core will send a write modify request (along with the data) to the shared cache agent 1207*d*. When the cache agent 1207*d* receives a write modify request, it checks the delayed prefetch manager to determine whether the cache line has any consumers (e.g., core 1201*b* in the illustrated example). The CAs 1207*d-k* then transmits the new cache line to any consumers who have a delayed prefetch outstanding (i.e., having executed a DP instruction) as a response to the delayed prefetch instruction (e.g., one at a time, or with a multicast or broadcast). In one implementation, all other copies of this cache line stored in core caches are invalidated. Finally, CA 1207*d-k* updates the copy of the cache line in the L3 cache 1220. In some implementations, the copy in the L3 cache may be updated before the consumers receive their updates.

As mentioned, each delayed prefetch manager 1300*a-h* may be implemented in a variety of ways and/or may be distributed among the various cache agents 1207*c*, 1207*a-b*. A single delayed prefetch manager may be used for the shared region 1210. For example, in one embodiment, each cache agent includes a multiple-entry buffer for delayed prefetch requests where each entry includes an address and a valid bit per core. Alternatively, one embodiment comprises a pool of shared entries, with each entry including a core identifier (ID), an address, and a valid bit. If the buffer is full and another delayed prefetch arrives, either the new request is dropped or one of the existing requests may be dropped (e.g., using a first-in-first-out queuing mechanism).

Figure 14:
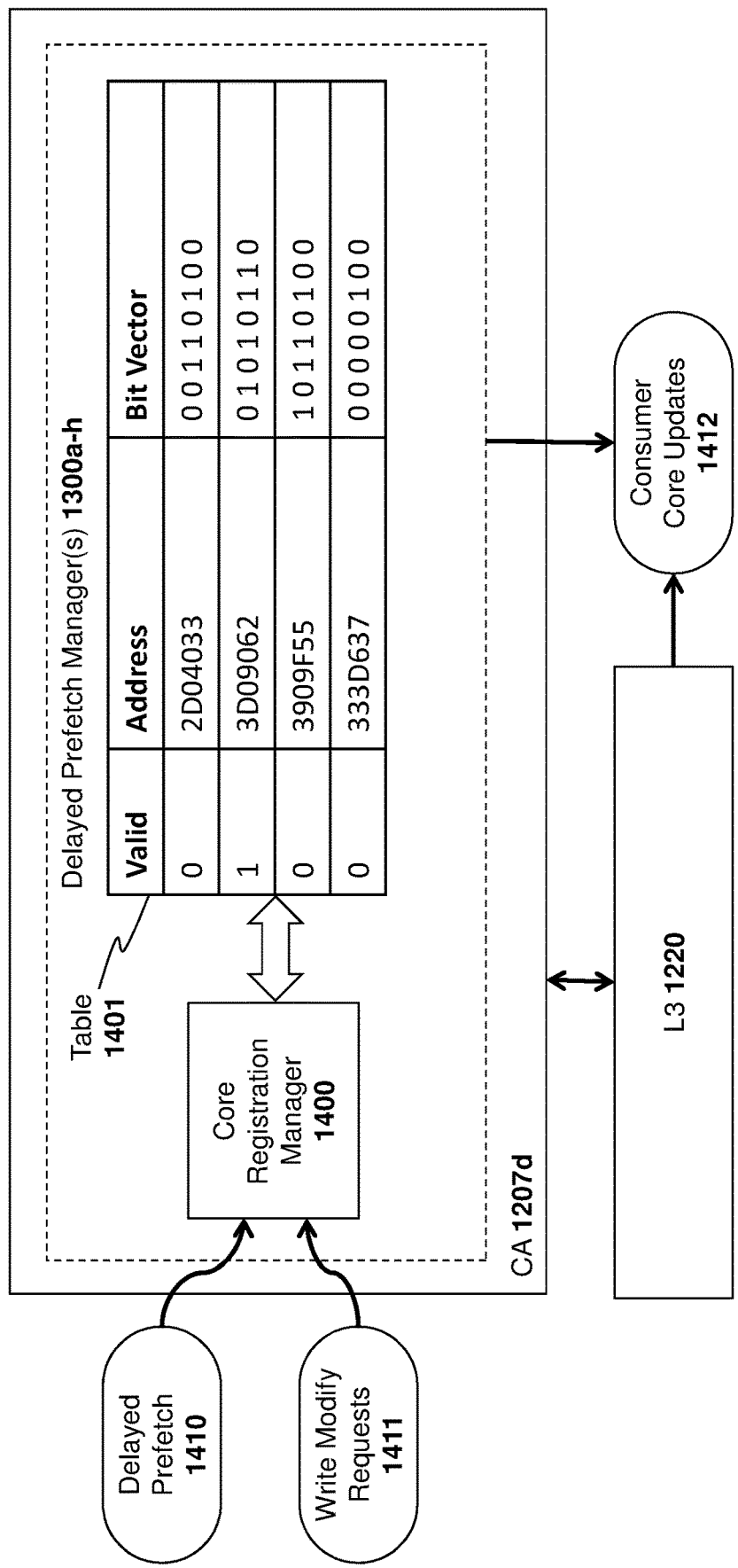
FIG. 14 illustrates a method in accordance with one embodiment of the invention.

In one implementation each delayed prefetch manager 1300*a-h* compares each write modify request to the stored delayed prefetch requests. Depending on the organization of the buffer or other data structure, the delayed prefetch manager may need to compare the incoming request address against the address in all buffer entries. Another embodiment that reduces the comparisons comprises, for each cache line held at the cache agent, a bit vector to indicate which cores have a delayed prefetch for the line (e.g., similar to the core valid (CV) bits used on some existing architectures), One embodiment illustrated in FIG. 14 implements a hybrid approach in which each delayed prefetch manager 1300*a-h* includes a table 1401 with a limited number of entries (e.g., four, eight, etc). As illustrated, each entry includes a valid bit to indicate whether the entry is currently valid, an address associated with the delayed prefetch operations, and a bit vector indicating which cores have executed a delayed prefetch for the cache line. Each bit within the bit vector is associated with a particular core. A value of 1 indicates that the core has executed a delayed prefetch for the cache line and a value of 0 indicates the absence of a delayed prefetch operation.

In one embodiment, when a delayed prefetch 1410 arrives, if that address already has an entry within the table 1401, then the bit in that entry's bit vector corresponding to the requesting core is turned on. If not, then a new delayed prefetch entry is created for that address with the bit associated with the requesting core set in the bit vector having the bit associated with the requesting core set. In any case, when a write modify request 1411 arrives, if a corresponding entry exists within the table 1401, those cores with outstanding delayed prefetch requests (i.e., having a 1 in the bit vector) are updated 1412 with the new cache line.

Table B below tabulates the actions for one embodiment, during a multicast operation, with items off the critical path in parentheses.

TABLE B

| Event | # Actions at CA for the line (serialized) | Minimum Latency |
|---|---|---|
| Worker threads read the line, then issue delayed prefetch | (#cores × 2) | (Core to CA × 3) |

TABLE B-continued

| Event | # Actions at CA for the line (serialized) | Minimum Latency |
|---|---|---|
| Master core sends special write modify instruction | 1 | Core to CA |
| CA sends the data to all worker threads | 1 | Core to CA |
| Total | 2 | Core to CA × 2 |

In one embodiment, at least one private CA of each core includes a delayed prefetch manager, like the delayed prefetch manager described above. In this implementation, each delayed prefetch request is transmitted through a core's lowest-level private CA/cache (e.g., CA 1207*a-b* and L2 caches 1213*a-b* in the illustrated implementations). The L3 cache agents 1207*d-k* do not need to be notified that the core executed a delayed prefetch. Because the L2 caches 1213*a-b* are private, the L2 cache agents 1207*a-b* store the delayed prefetch request in a buffer or other form of delayed prefetch manager with entries containing the address associated with the prefetch request and a valid bit. The buffer, table or other storage used in the delayed prefetch manager may be organized in variety of ways such as a fully-associative storage structure.

Once a delayed prefetch request has been buffered, if any core subsequently writes to the cache line using, for example, a conventional store operation, a request for ownership is sent out, resulting in the invalidation of all current copies of the cache line (under the control of the relevant caching agents). This may (but does not have to) result in all delayed prefetches for the cache line being dropped/invalidated.

If instead a core (e.g., thread T1) writes to the cache line with a write modify instruction, that core will send the write modify request (along with the data) to one of the core's cache agents (e.g., 1207*a* or 1207*b*). In one embodiment, when a cache agent 1207*a-b* receives a write modify request, it sends a special snoop multicast request, with the cache line data, to all current sharers of the cache line. The cache agent for the lowest-level private cache for each sharer checks its delayed prefetch manager upon receipt of this request to determine if it has a delayed prefetch entry for the cache line. If so, it updates the cache line in the cache and any higher-level private caches (e.g., L1 caches), and notifies the other cache agents that it has retained a copy of the cache line. If the core's lowest level cache agent does not have a delayed prefetch entry, then it invalidates the cache line in its cache (e.g., L2) and any higher-level private caches (e.g., L1), and responds to each shared cache agent 1207*d-k* that the core no longer has a copy of the cache line.

Table C provides a tabulation of actions for this embodiment, during a multicast operation, with items off the critical path in parentheses.

TABLE C

| Event | # Actions at CA for the line (serialized) | Minimum Latency |
|---|---|---|
| Worker threads read the line, then issue delayed prefetch | (#cores) | (Core to CA) |
| Master core sends special write modify instruction | 1 | Core to CA |

TABLE C-continued

| Event | # Actions at CA for the line (serialized) | Minimum Latency |
|---|---|---|
| The CA will send a single snoop multicast with data request that will go to all cores | 1 | Core to CA |
| Worker cores respond according to their new state | (#cores) | (Core to CA) |
| Total | 2 | Core to CA × 2 |

The embodiments above have a critical path latency of two times the core-to-cache agent latency. This matches the hypothetical minimum, and is four times less than the baseline's critical path latency of eight times the core-to-cache agent latency. Further, both of these embodiments result in substantially less traffic to the cache agent, which is likely to have an additional positive impact on performance. Finally, if the on-die network supports a native multicast or broadcast mechanism, both of these embodiments may utilize it to further reduce on-die traffic and cache agent occupancy.

Figure 15:
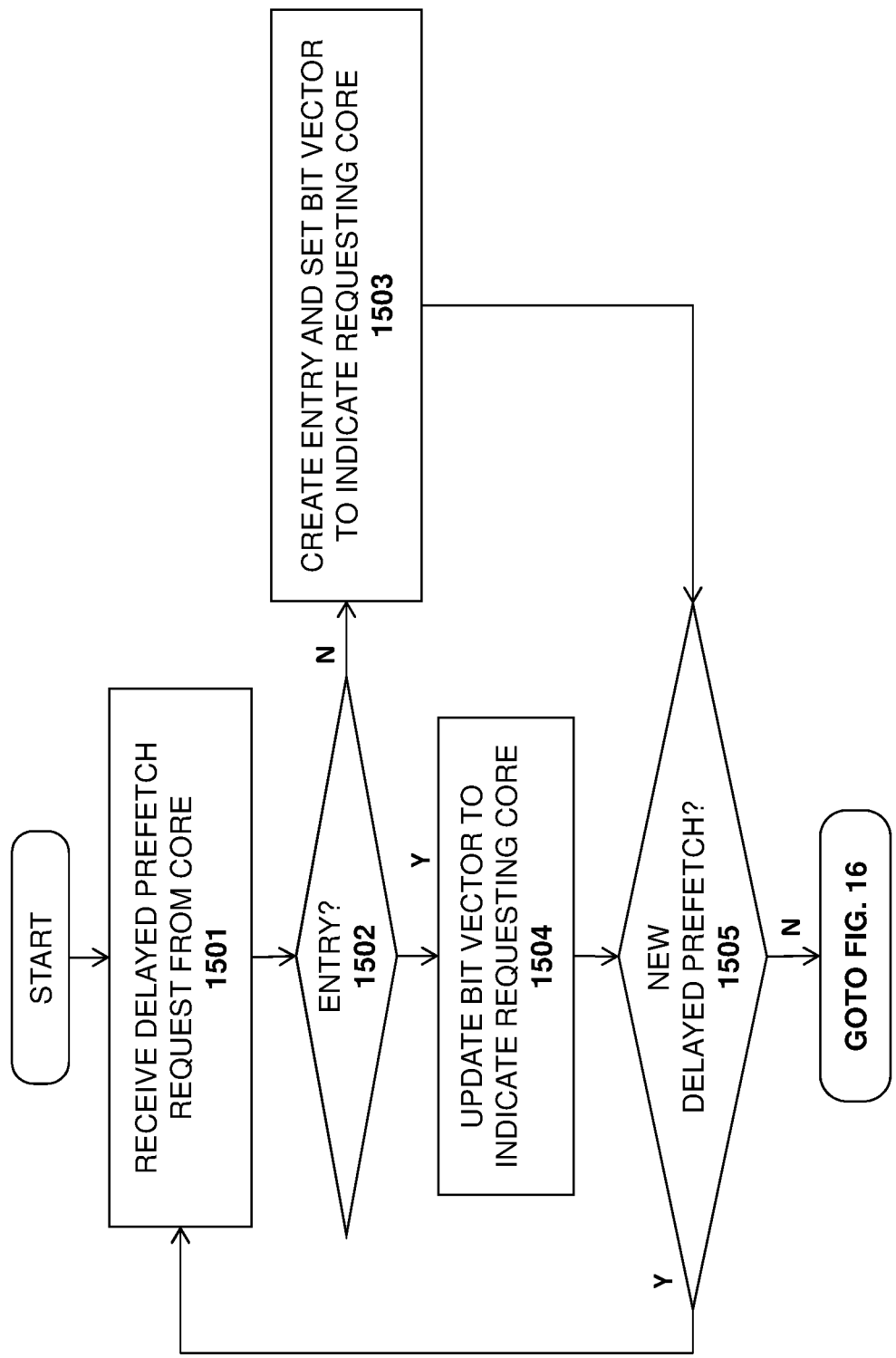
FIG. 15 illustrates a method in accordance with one embodiment of the invention.

A method in accordance with one embodiment of the invention is illustrated in FIG. 15. The method may be implemented on the different architectures described above, above but is not limited to any particular system or processor architecture.

At 1501, a delayed prefetch request is received from a core. For example, the delayed prefetch may be generated by a first thread executed on a first core. At 1502, a determination is made as to whether an entry exists for the delayed prefetch request. For example, a lookup may be performed in a buffer, table, or other data structure using a portion of the address associated with the delayed prefetch request.

Figure 16:
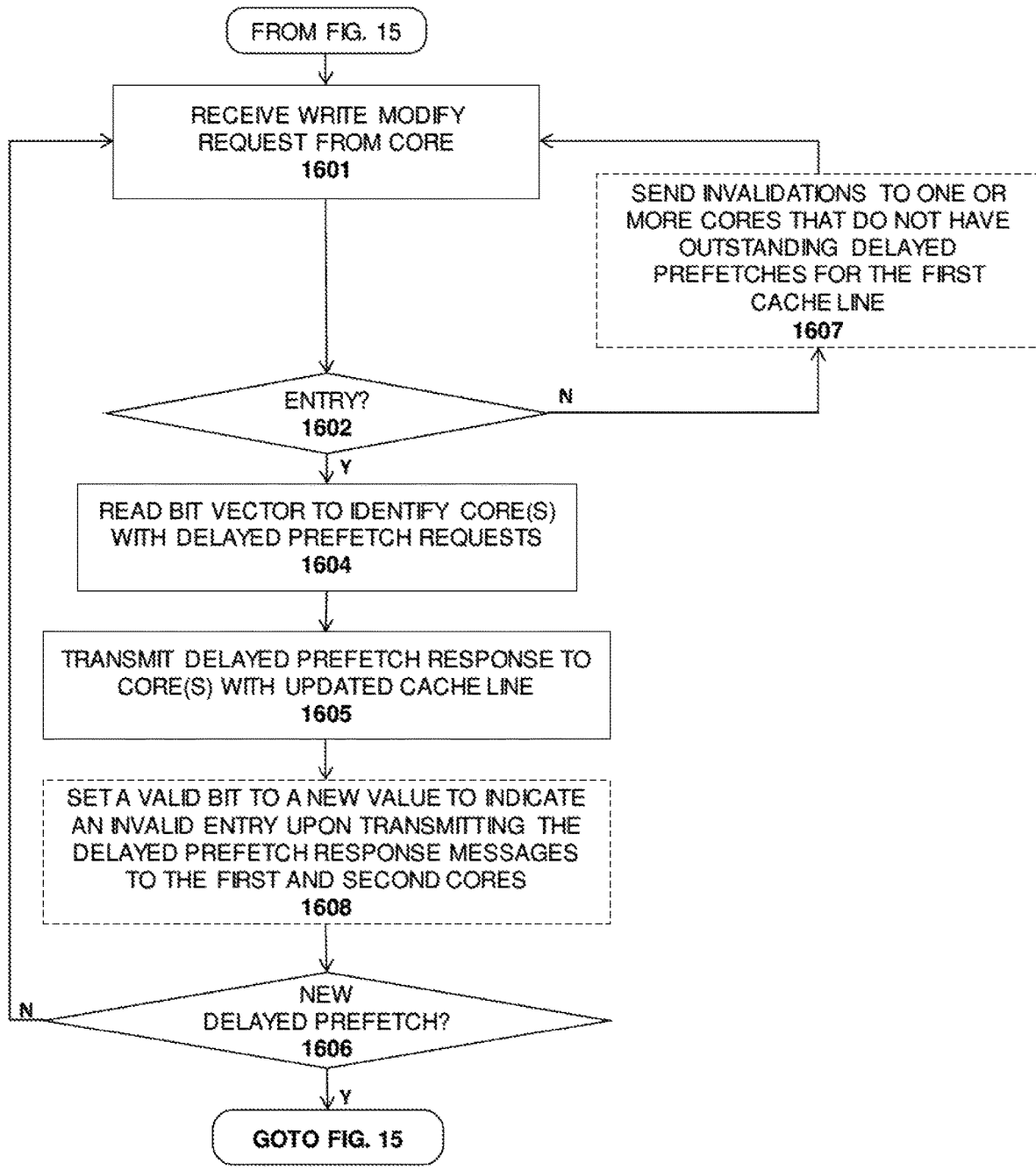
FIG. 16 illustrates a method in accordance with another embodiment of the invention.

If the entry exists, then at 1504 the bit vector of the entry is updated to identify the first core. This may be done by setting a bit associated with the first core. If an entry does not exist then a new entry is created at 1503 and the bit associated with the first core is set. Another entry may be replaced in this process, removing an entry with a 0 valid bit and/or using a first-in-first-out implementation or any other type of replacement policy (e.g., a least recently used policy). If a new delayed prefetch operation is received, determined at 1505, then the process returns to 1501. If not, then the process jumps to FIG. 16.

At 1601, a write modify request is received from a core (e.g., a second core). If an entry associated with the write modify request is received, determined at 1602, then the bit vector of the entry is read to identify core(s) with delayed prefetch requests. A delayed prefetch response is transmitted to the core(s) at 1605 along with a copy of the modified cache line. At this stage, the entry associated with the delayed prefetch may be tagged as invalid. If a new delayed prefetch is received, determined at 1606, the process jumps to 1501 in FIG. 15. Otherwise, the process returns to 1601 where a new write modify request is received from a core.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Components, features, and details described for any of the apparatus may also optionally apply to any of the methods, which in embodiments may be performed by and/or with such apparatus. Any of the processors described herein may be included in any of the systems disclosed herein. In some embodiments, the computer system may include an interconnect, a processor coupled with the interconnect, and a dynamic random access memory (DRAM) coupled with the interconnect. Alternatively, instead of DRAM, other types of volatile memory that don't need to be refreshed may be used, or flash memory may be used.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to particular embodiments. Specifics in these examples may be used anywhere and in any combination.

Example 1

A processor comprising: a plurality of cores to execute instructions; a shared circuitry region to be shared by the plurality of cores; first cache management circuitry associated with the shared circuitry region to receive delayed prefetch messages from the cores, each delayed prefetch message comprising an address or portion thereof usable to identify a cache line; and a delayed prefetch manager comprising a plurality of entries, each entry associated with at least one of the delayed prefetch messages, the delayed prefetch manager to update one or more of the entries or generate a new entry in accordance with receipt of each new delayed prefetch message, wherein upon receiving a notification that a first cache line is being modified by a first core, the delayed prefetch manager is to transmit delayed prefetch response messages to one or more cores identified in a first entry associated with the first cache line.

Example 2

The processor of Example 1 wherein the delayed prefetch response message comprises a copy of the first cache line, as modified by the first core.

Example 3

The processor of Example 2 wherein the first cache management circuitry comprises a caching agent (CA) associated with a shared cache within the shared circuitry region.

Example 4

The processor of Example 3 wherein the shared cache comprises a Level 3 (L3) cache.

Example 5

The processor of Example 1 wherein the delayed prefetch manager comprises a table or buffer to store the entries, and wherein each entry includes a first field to identify a cache line and a second field to identify one or more cores.

Example 6

The processor of Example 5 wherein the second field comprises a bit vector with a bit associated with each core, wherein a first bit is to be set to a first value upon receipt of a first delayed prefetch request message identifying the first cache line from a first core corresponding to the first bit.

Example 7

The processor of Example 6 wherein a second bit is to be set to a second value upon receipt of a second delayed prefetch request message identifying the first cache line from a second core corresponding to the second bit.

Example 8

The processor of Example 7 wherein upon receipt of a first notification that the first cache line is being modified by a third core, the delayed prefetch manager is to responsively read the bit vector to identify the first and second cores, and to transmit delayed prefetch response messages to both the first core and the second core.

Example 9

The processor of Example 8 wherein each entry comprises a valid bit and wherein the delayed prefetch manager is to set the valid bit to a new value to indicate an invalid entry upon transmitting the delayed prefetch response messages to the first and second cores.

Example 10

The processor of Example 1 wherein the notification that the first cache line is being modified by the first core if generated in response to a Write Modify instruction executed by the first core.

Example 11

A method comprising: executing instructions on a processor comprising a plurality of cores and a shared circuitry region to be shared by the plurality of cores; receiving delayed prefetch messages from the cores, each delayed prefetch message comprising an address or portion thereof; updating a delayed prefetch tracking data structure comprising a plurality of entries in response to receiving the delayed prefetch messages, wherein updating comprises comparing each address or portion thereof to a set of existing entries and, if a match is found for an existing entry, then updating the existing entry and, if a match is not found, then creating a new entry; receiving a notification that a first cache line is being modified by a first core; identifying a first entry associated with the first cache line; and transmitting delayed prefetch response messages to a set of one or more cores identified in a first entry associated with the first cache line.

Example 12

The method of Example 11 wherein the delayed prefetch response message comprises a copy of the first cache line, as modified by the first core.

Example 13

The method of Example 12 wherein the first cache management circuitry comprises a caching agent (CA) associated with a shared cache within the shared circuitry region.

Example 14

The method of Example 13 wherein the shared cache comprises a Level 3 (L3) cache.

Example 15

The method of Example 11 wherein the delayed prefetch tracking data structure comprises a table or buffer to store the entries, and wherein each entry includes a first field to identify a cache line and a second field to identify one or more cores.

Example 16

The method of Example 15 wherein the second field comprises a bit vector with a bit associated with each core, wherein a first bit is to be set to a first value upon receipt of a first delayed prefetch request message identifying the first cache line from a first core corresponding to the first bit.

Example 17

The method of Example 16 wherein a second bit is to be set to a second value upon receipt of a second delayed prefetch request message identifying the first cache line from a second core corresponding to the second bit.

Example 18

The method of Example 17 wherein upon receipt of a first notification that the first cache line is being modified by a third core, the bit vector is to be read to identify the first and second cores, and to transmit delayed prefetch response messages to both the first core and the second core.

Example 19

The method of Example 18 wherein each entry comprises a valid bit which is to be set to a new value to indicate an invalid entry upon transmitting the delayed prefetch response messages to the first and second cores.

Example 20

The method of Example 11 further comprising: generating the notification in response to the first core executing a Write Modify instruction.

Example 21

A machine-readable medium having program code stored thereon which, when executed by a machine, causes the machine to perform the operations of: executing instructions on a processor comprising a plurality of cores and a shared circuitry region to be shared by the plurality of cores; receiving delayed prefetch messages from the cores, each delayed prefetch message comprising an address or portion thereof; updating a delayed prefetch tracking data structure comprising a plurality of entries in response to receiving the delayed prefetch messages, wherein updating comprises comparing each address or portion thereof to a set of existing entries and, if a match is found for an existing entry, then updating the existing entry and, if a match is not found, then creating a new entry; receiving a notification that a first cache line is being modified by a first core; identifying a first entry associated with the first cache line; and transmitting delayed prefetch response messages to a set of one or more cores identified in a first entry associated with the first cache line.

Example 22

The machine-readable medium of Example 21 wherein the delayed prefetch response message comprises a copy of the first cache line, as modified by the first core.

Example 23

The machine-readable medium of Example 22 wherein the first cache management circuitry comprises a caching agent (CA) associated with a shared cache within the shared circuitry region.

Example 24

The machine-readable medium of Example 23 wherein the shared cache comprises a Level 3 (L3) cache.

Example 25

The machine-readable medium of Example 21 wherein the delayed prefetch tracking data structure comprises a table or buffer to store the entries, and wherein each entry includes a first field to identify a cache line and a second field to identify one or more cores.

Example 26

The machine-readable medium of Example 25 wherein the second field comprises a bit vector with a bit associated with each core, wherein a first bit is to be set to a first value upon receipt of a first delayed prefetch request message identifying the first cache line from a first core corresponding to the first bit.

Example 27

The machine-readable medium of Example 26 wherein a second bit is to be set to a second value upon receipt of a second delayed prefetch request message identifying the first cache line from a second core corresponding to the second bit.

Example 28

The machine-readable medium of Example 27 wherein upon receipt of a first notification that the first cache line is being modified by a third core, the bit vector is to be read to identify the first and second cores, and to transmit delayed prefetch response messages to both the first core and the second core.

Example 29

The machine-readable medium of Example 28 wherein each entry comprises a valid bit which is to be set to a new value to indicate an invalid entry upon transmitting the delayed prefetch response messages to the first and second cores.

Example 30

The machine-readable medium of Example 21 further comprising: generating the notification in response to the first core executing a Write Modify instruction.

Example 31

A system comprising: a memory for storing instructions and data; a processor comprising: a plurality of cores to execute instructions; a shared circuitry region to be shared by the plurality of cores; first cache management circuitry associated with the shared circuitry region to receive delayed prefetch messages from the cores, each delayed prefetch message comprising an address or portion thereof usable to identify a cache line; and a delayed prefetch manager comprising a plurality of entries, each entry associated with at least one of the delayed prefetch messages, the delayed prefetch manager to update one or more of the entries or generate a new entry in accordance with receipt of each new delayed prefetch message, wherein upon receiving a notification that a first cache line is being modified by a first core, the delayed prefetch manager is to transmit delayed prefetch response messages to one or more cores identified in a first entry associated with the first cache line. The system further includes a graphics processor to receive and process graphics commands received from the processor; a network interface to couple the processor to a network; and a storage device coupled to the processor to store program code and data to be processed by the processor.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a plurality of cores to execute instructions;
a shared circuitry region to be shared by the plurality of cores;
first cache management circuitry associated with the shared circuitry region to receive delayed prefetch messages from the cores, each delayed prefetch message comprising an address or portion thereof usable to identify a cache line; and
a delayed prefetch manager comprising a plurality of entries, each entry associated with at least one of the delayed prefetch messages, the delayed prefetch manager to update one or more of the entries or generate a new entry in accordance with receipt of each new delayed prefetch message,
wherein upon receiving a notification that a first cache line is being modified by a first core, the delayed prefetch manager is to transmit delayed prefetch response messages to one or more cores identified in a first entry associated with the first cache line, wherein the delayed prefetch response message comprises a copy of the first cache line, as modified by the first core.

2. The processor of claim 1 wherein the first cache management circuitry comprises a caching agent (CA) associated with a shared cache within the shared circuitry region.

3. The processor of claim 2 wherein the delayed prefetch manager is to send invalidations to one or more cores that do not have outstanding delayed prefetches for the first cache line.

4. The processor of claim 1 wherein the delayed prefetch manager comprises a table or buffer to store the entries, and wherein each entry includes a first field to identify a cache line and a second field to identify one or more cores.

5. The processor of claim 4 wherein the second field comprises a bit vector with a bit associated with each core, wherein a first bit is to be set to a first value upon receipt of a first delayed prefetch request message identifying the first cache line from a first core corresponding to the first bit.

6. The processor of claim 5 wherein a second bit is to be set to a second value upon receipt of a second delayed prefetch request message identifying the first cache line from a second core corresponding to the second bit.

7. The processor of claim 6 wherein upon receipt of a first notification that the first cache line is being modified by a third core, the delayed prefetch manager is to responsively read the bit vector to identify the first and second cores, and to transmit delayed prefetch response messages to both the first core and the second core.

8. The processor of claim 7 wherein each entry comprises a valid bit and wherein the delayed prefetch manager is to set the valid bit to a new value to indicate an invalid entry upon transmitting the delayed prefetch response messages to the first and second cores.

9. The processor of claim 1 wherein the notification that the first cache line is being modified by the first core is generated in response to a Write Modify instruction executed by the first core.

10. A method comprising:
executing instructions on a processor comprising a plurality of cores and a shared circuitry region to be shared by the plurality of cores;
receiving delayed prefetch messages from the cores, each delayed prefetch message comprising an address or portion thereof;
updating a delayed prefetch tracking data structure comprising a plurality of entries in response to receiving the delayed prefetch messages, wherein updating comprises comparing each address or portion thereof to existing entries and, if a match is found for an existing entry, then updating the existing entry and, if a match is not found, then creating a new entry;
receiving a notification that a first cache line is being modified by a first core;
identifying a first entry associated with the first cache line; and
transmitting delayed prefetch response messages to one or more cores identified in a first entry associated with the first cache line, wherein the delayed prefetch response message comprises a copy of the first cache line, as modified by the first core.

11. The method of claim 10 wherein the first cache management circuitry comprises a caching agent (CA) associated with a shared cache within the shared circuitry region.

12. The method of claim 11 wherein the delayed prefetch manager is to send invalidations to one or more cores that do not have outstanding delayed prefetches for the first cache line.

13. The method of claim 10 wherein the delayed prefetch tracking data structure comprises a table or buffer to store the entries, and wherein each entry includes a first field to identify a cache line and a second field to identify one or more cores.

14. The method of claim 13 wherein the second field comprises a bit vector with a bit associated with each core, wherein a first bit is to be set to a first value upon receipt of a first delayed prefetch request message identifying the first cache line from a first core corresponding to the first bit.

15. The method of claim 14 wherein a second bit is to be set to a second value upon receipt of a second delayed prefetch request message identifying the first cache line from a second core corresponding to the second bit.

16. The method of claim 15 wherein upon receipt of a first notification that the first cache line is being modified by a third core, the bit vector is to be read to identify the first and second cores, and to transmit delayed prefetch response messages to both the first core and the second core.

17. The method of claim 16 wherein each entry comprises a valid bit which is to be set to a new value to indicate an invalid entry upon transmitting the delayed prefetch response messages to the first and second cores.

18. The method of claim 10 further comprising:
generating the notification in response to the first core executing a Write Modify instruction.

19. A machine-readable medium having program code stored thereon which, when executed by a machine, causes the machine to perform the operations of:
executing instructions on a processor comprising a plurality of cores and a shared circuitry region to be shared by the plurality of cores;
receiving delayed prefetch messages from the cores, each delayed prefetch message comprising an address or portion thereof;
updating a delayed prefetch tracking data structure comprising a plurality of entries in response to receiving the delayed prefetch messages, wherein updating comprises comparing each address or portion thereof to existing entries and, if a match is found for an existing entry, then updating the existing entry and, if a match is not found, then creating a new entry;
receiving a notification that a first cache line is being modified by a first core;
identifying a first entry associated with the first cache line; and
transmitting delayed prefetch response messages to one or more cores identified in a first entry associated with the first cache line, wherein the delayed prefetch response message comprises a copy of the first cache line, as modified by the first core.

20. The machine-readable medium of claim 19 wherein the first cache management circuitry comprises a caching agent (CA) associated with a shared cache within the shared circuitry region.

21. The machine-readable medium of claim 20 wherein the delayed prefetch manager is to send invalidations to one or more cores that do not have outstanding delayed prefetches for the first cache line.

22. The machine-readable medium of claim 19 wherein the delayed prefetch tracking data structure comprises a table or buffer to store the entries, and wherein each entry includes a first field to identify a cache line and a second field to identify one or more cores.

23. The machine-readable medium of claim 22 wherein the second field comprises a bit vector with a bit associated with each core, wherein a first bit is to be set to a first value upon receipt of a first delayed prefetch request message identifying the first cache line from a first core corresponding to the first bit.

24. The machine-readable medium of claim 23 wherein a second bit is to be set to a second value upon receipt of a second delayed prefetch request message identifying the first cache line from a second core corresponding to the second bit.

25. The machine-readable medium of claim 24 wherein upon receipt of a first notification that the first cache line is being modified by a third core, the bit vector is to be read to identify the first and second cores, and to transmit delayed prefetch response messages to both the first core and the second core.

26. The machine-readable medium of claim 25 wherein each entry comprises a valid bit which is to be set to a new value to indicate an invalid entry upon transmitting the delayed prefetch response messages to the first and second cores.

27. The machine-readable medium of claim 19 further comprising:

generating the notification in response to the first core executing a Write Modify instruction.

28. A system comprising:
a memory for storing instructions and data;
a processor comprising:
  a plurality of cores to execute instructions;
  a shared circuitry region to be shared by the plurality of cores;
  first cache management circuitry associated with the shared circuitry region to receive delayed prefetch messages from the cores, each delayed prefetch message comprising an address or portion thereof usable to identify a cache line; and
  a delayed prefetch manager comprising a plurality of entries, each entry associated with at least one of the delayed prefetch messages, the delayed prefetch manager to update one or more of the entries or generate a new entry in accordance with receipt of each new delayed prefetch message,
  wherein upon receiving a notification that a first cache line is being modified by a first core, the delayed prefetch manager is to transmit delayed prefetch response messages to one or more cores identified in a first entry associated with the first cache line, wherein the delayed prefetch response message comprises a copy of the first cache line, as modified by the first core;
a graphics processor to receive and process graphics commands received from the processor;
a network interface to couple the processor to a network;
a storage device coupled to the processor to store program code and data to be processed by the processor.

* * * * *